(12) United States Patent
Mischiatti et al.

(10) Patent No.: US 9,841,025 B2
(45) Date of Patent: Dec. 12, 2017

(54) DEVICE FOR TRANSMITTING POWER THROUGH ROTATING MAGNETIC FIELDS

(75) Inventors: Adriano Mischiatti, Corbola (IT); Antonio Mischiatti, Corbola (IT); Massimo Mischiatti, Corbola (IT)

(73) Assignee: M PUMPS PROCESS SRL, Corbola (RO) (IT)

( * ) Notice: Subject to any disclaimer, the term of this patent is extended or adjusted under 35 U.S.C. 154(b) by 0 days.

(21) Appl. No.: 14/234,619

(22) PCT Filed: Oct. 31, 2011

(86) PCT No.: PCT/IB2011/054821
§ 371 (c)(1),
(2), (4) Date: Feb. 4, 2014

(87) PCT Pub. No.: WO2013/064857
PCT Pub. Date: May 10, 2013

(65) Prior Publication Data
US 2014/0234142 A1    Aug. 21, 2014

(51) Int. Cl.
| H02K 49/00 | (2006.01) |
| H02K 1/32 | (2006.01) |
| F04D 13/06 | (2006.01) |
| F04B 17/00 | (2006.01) |
| F04D 13/02 | (2006.01) |
| F04D 15/02 | (2006.01) |
| H02K 49/10 | (2006.01) |
| H02K 5/128 | (2006.01) |

(52) U.S. Cl.
CPC ......... *F04D 13/025* (2013.01); *F04D 13/027* (2013.01); *F04D 13/0626* (2013.01); *F04D 15/0263* (2013.01); *H02K 49/102* (2013.01); *H02K 49/106* (2013.01); *H02K 2005/1287* (2013.01)

(58) Field of Classification Search
CPC ............................... H02K 49/00; F04D 13/02
USPC ................................... 310/103; 417/63, 420
See application file for complete search history.

(56) References Cited

U.S. PATENT DOCUMENTS

| 4,752,194 A * | 6/1988 | Wienen ............... H02K 49/106 417/420 |
| 5,484,265 A * | 1/1996 | Horvath ............. F04D 15/0263 417/32 |
| 6,039,827 A * | 3/2000 | Cramer ............... H02K 49/106 156/169 |
| 6,293,772 B1 * | 9/2001 | Brown ................ F04D 29/041 415/122.1 |

(Continued)

FOREIGN PATENT DOCUMENTS

| DE | 4342649 | 2/1995 |
| EP | 0610562 | 8/1994 |

(Continued)

*Primary Examiner* — Jose Gonzalez Quinones
(74) *Attorney, Agent, or Firm* — Thermis Law

(57) ABSTRACT

A device for the transmission of power using rotating magnetic fields includes a drive shaft with an external magnet, a pump shaft with an internal magnet suited to entrained by the external magnet, a rear tight chamber or containment body for the pump shaft and the internal magnet, the rear body being positioned between the internal magnet and external magnet. The rear body includes at least a glass-shaped casing and one or more probes buried within the thickness of the glass-shaped casing.

6 Claims, 2 Drawing Sheets

(56) References Cited

U.S. PATENT DOCUMENTS

2007/0217480 A1* 9/2007 Lai .................. G01K 13/08
                                                    374/208
2011/0293450 A1* 12/2011 Grimes .............. F04B 53/16
                                                    417/420

FOREIGN PATENT DOCUMENTS

EP          1091128       4/2001
IT          PD20100249    2/2012

* cited by examiner

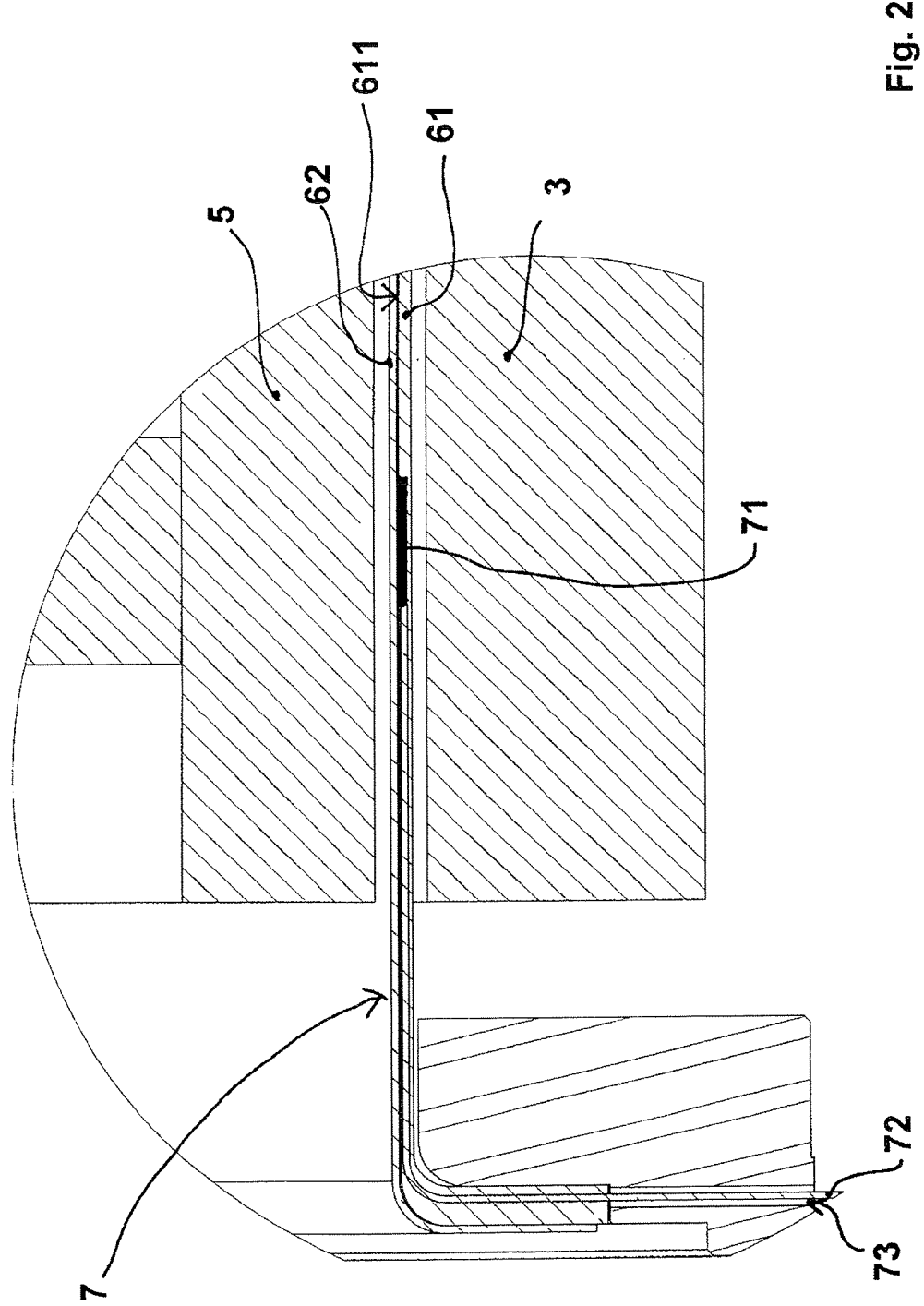

DEVICE FOR TRANSMITTING POWER THROUGH ROTATING MAGNETIC FIELDS

FIELD OF THE INVENTION

This patent relates to devices for the transmission of power by means of rotating magnetic fields and in particular relates to a new device for the transmission of power, such as magnetic pumps, agitators, mixers, blenders, high precision grinding machines, etc., by means of two coaxial magnets separated by a glass-shaped casing or cylindrical wall which determines a sealed chamber or rear body of the device. This glass-shaped casing or cylindrical wall is made of a multilayer material and possibly equipped with probes and/or monitoring sensors.

BACKGROUND OF THE INVENTION

The prior art includes magnetic pumps comprising a pump body to house the motor connected to a drive shaft, and a hermetically sealed chamber or volute with an inlet and outlet for the liquid to circulate, inside of which at least one impeller coupled with a pump shaft rotates.

The drive of said pump shaft, and therefore of the impeller, is achieved through an internal magnet coupled to said drive shaft, said internal impeller being driven by a magnet of the drive shaft, or by an external magnet.

In magnetic pumps of the known type said volute or hydraulic component is partially constituted by a rear body firmly fixed to the pump body and partially by another portion constituted by a lid connectable to the pump body.

This rear body of magnetic pumps of a known type comprise a glass-shaped casing placed between said external magnet and said internal magnet.

The use of probes to monitor the pump's operating parameters is a known technique.

In particular, the use of probes to monitor the temperature of said rear body is known, said probes being bound to said rear body in the area affected by the magnetic field.

The magnetic field generated by the external rotating magnet induces a current in the rear body, if made of metal material, which heats the rear body. Under normal operating conditions, the rear body is cooled when the pump is running.

Nonetheless the temperature must be constantly monitored because, in the case of malfunctions, sudden increases in temperature may occur that require timely maintenance and repair interventions.

These increases in temperature of pump parts may damage the pump or even cause fires or explosions, especially in the case where flammable fluids are pumped.

Patents EP 0 610 562 and EP 1 091 128 relate to magnetic pumps with a temperature sensor installed on the glass-shaped casing, and where said sensor comprises a thermocouple that has a conductor formed by the glass-shaped casing itself and the other conductor is attached to the surface of the glass-shaped casing.

This sensor may for example comprise a flat terminal located on the surface of the glass-shaped casing facing the external magnet.

Glass-shaped casings of the known type essentially have a structural function, being containers under pressure.

Glass-shaped casings made entirely of metal, which involve magnetic losses inside the magnetic field, or made entirely of non-metal material are already known.

However, pumps with non-metal glass-shaped casings cannot be used in environments such as refineries and petrochemical plants where the fluids being pumped cannot come into contact with non-metal surfaces.

Patents DE 4342649, U.S. Pat. No. 4,854,823 and JP 63-257451 relate to magnetic pumps equipped with composite glass-shaped casings, that is, comprising an external wall made of a different material from the internal wall.

SUMMARY OF THE INVENTION

To overcome the aforementioned problems a new type of device for the transmission of power was studied and developed, like for example a magnetic pump, comprising a cylindrical wall or glass-shaped casing which determines a sealed chamber or rear body. Said wall or glass-shaped casing is equipped with probes or monitoring sensors integrated into the thickness of said glass-shaped casing.

The main purpose of the present invention is to monitor the temperature of the rear body immersed in the magnetic field, where the temperature sensors are integrated in the thickness of the glass-shaped casing, thereby allowing measurements with greater accuracy compared to systems of the known art.

Another purpose of the present invention is to ensure the hermetic seal of the device given that the glass-shaped casing is at least double-walled. In this way, the hermetic seal is guaranteed even in the case of a first breakage of the rear body, which in that case would allow a timely repair intervention.

Another advantage of this invention is that it can be used in environments such as refineries or petrochemical plants where the fluid being pumped cannot come into contact with non-metal surfaces.

Another advantage of this invention is that it can be used in applications where it is preferable to have no magnetic losses attributable to rear bodies made of metal materials.

These and other purposes, direct and complementary, are achieved by this new type of device for the transmission of power, such as a magnetic pump, comprising a cylindrical wall or glass-shaped casing determining a sealed chamber or rear body, where said cylindrical wall or glass-shaped casing is equipped with probes and/or monitoring sensors and said glass-shaped casing is preferably made of a multilayer structure.

In the event the invention is applied to a magnetic pump, the pump shall comprise in its main parts a body with a drive shaft and at least one external magnet keyed on said drive shaft, a pump shaft, at least one internal magnet keyed on said pump shaft suited to be driven by said external magnet, a rear body to house said internal magnet of said pump shaft and one or more impellers, said rear body being housed between said internal magnet and said external magnet.

Said rear body comprises one or more sensors or probes suited to monitor the operating conditions of the pump, said sensors or probes being integrated into the thickness of said glass-shaped casing.

In particular, it is expected that said rear body comprises at least one temperature sensor, which in turn comprises a miniature thermocouple integrated into the glass-shaped casing thickness, preferably within the magnetic field between said external magnet and said internal magnet.

In the preferred embodiment, said rear body is determined by a substantially cylindrical wall or sealed glass-shaped casing, where said cylindrical wall or glass-shaped casing in turn comprises a first external glass-shaped casing, with a structural function, and a second glass-shaped casing or internal glass-shaped casing housed in said external glass-shaped casing, suited to be in direct contact with the pumped fluid.

In an alternative embodiment, said external glass-shaped casing is preferably made of material other than metal, that is, composite and/or thermoplastic and/or thermosetting and/or ceramic, etc., so that it does not lead to any magnetic loss.

In contrast, said internal glass-shaped casing may be made of metal or non-metal material.

In particular, if the invention is to be used in environments such as refineries or petrochemical plants, where the pumped liquid must not come into contact with non-metal surfaces, said internal glass-shaped casing can be conveniently made of a metal material.

According to a further possible embodiment, said internal glass-shaped casing is deposited in a continuous layer directly on the internal surface of said external glass-shaped casing through a chemical and/or electrochemical process.

Said internal glass-shaped casing can also be made of metal with other metal and/or non-metal elements.

According to a further embodiment, said internal glass-shaped casing can be made of non-metal material.

Said internal glass-shaped casing acts as a first containment so that in the case of breakage, the hermetic seal of the rear body is guaranteed by the presence of the external glass-shaped casing, leaving time for corrective actions.

The invention also foresees that said one or more sensors or probes intended to monitor the pump operating conditions are particularly installed between said external glass-shaped casing and said internal glass-shaped casing.

In particular, said temperature sensor is installed between said external glass-shaped casing and said internal glass-shaped casing or embedded in the thickness of said external glass-shaped casing and/or said internal glass-shaped casing.

Said rear body may also comprise one or more additional sensors such as pressure and/or liquid sensors, suitable for the early identification of any broken glass-shaped casing of said internal and/or external glass-shaped casing.

BRIEF DESCRIPTION OF THE DRAWINGS

The attached drawings show, by way of a non-limiting example, a practical embodiment of the invention applied to a magnetic pump.

FIG. 1 shows a section of the rear body (1) of the pump, while FIG. 2 shows a detail of the rear body (1) with an installed temperature sensor (7).

DETAILED DESCRIPTION OF EMBODIMENTS OF THE INVENTION

Figure 1:
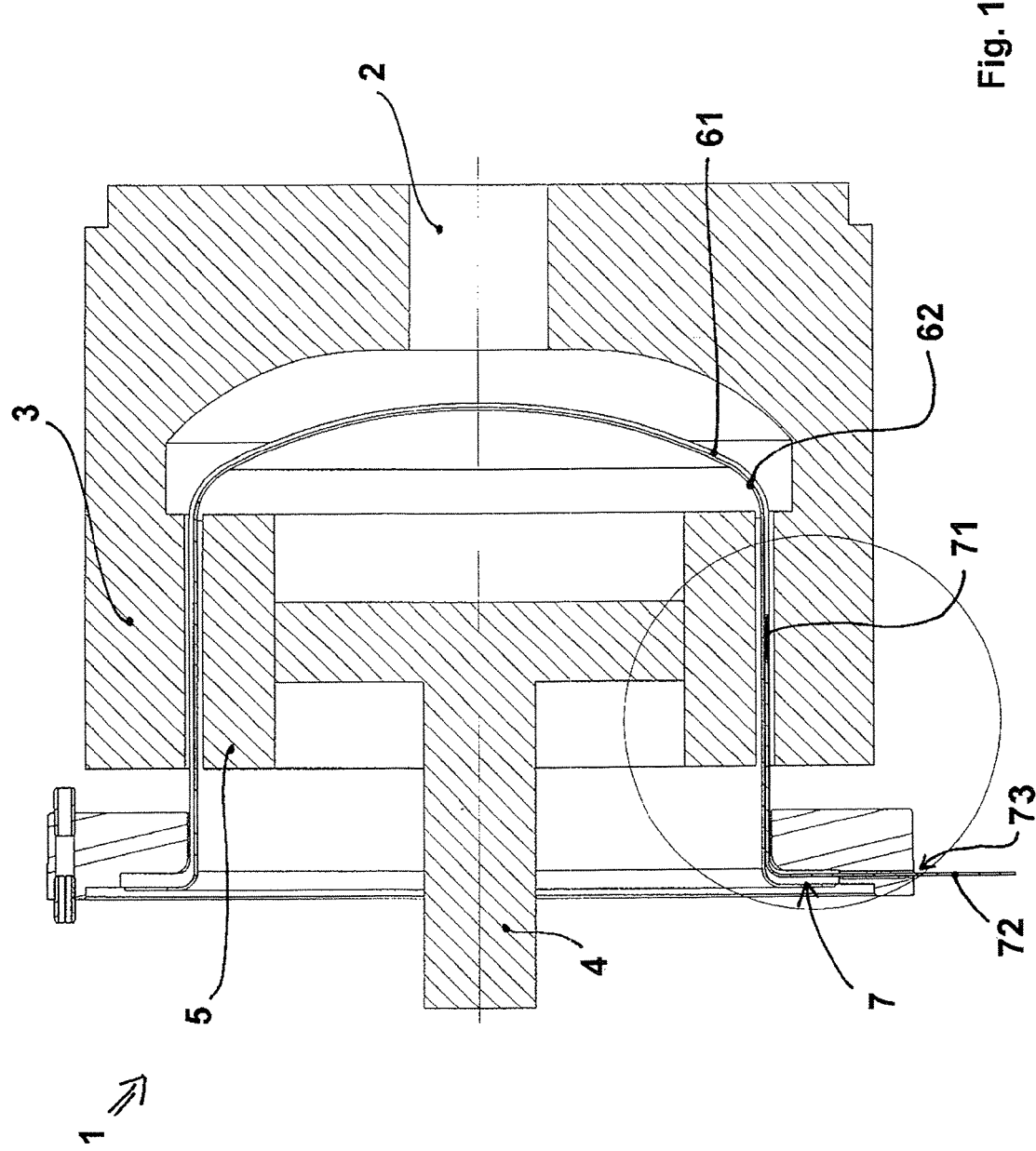

In one embodiment, the present invention relates to a new magnetic pump comprising a pump body with a drive shaft (2) and at least one external magnet (3) keyed on said drive shaft (2), a pump shaft (4), at least one internal magnet (5) keyed on said pump shaft (4) and suited to be driven by said external magnet (3), a containing rear body (1) of said pump shaft (4) of said internal magnet (5) and one or more impellers, said rear body (1) being positioned between said internal magnet (5) and said external magnet (3).

Said rear body (1) comprises a first hermetically sealed cup-shaped (defined here also as glass-shaped) casing (61), or external cup-shaped (defined here also as glass-shaped) casing, having a structural function, and a second glass-shaped casing (62), or internal glass-shaped casing, housed in said external glass-shaped casing (61) suited to be in direct contact with the pumped fluid.

Said internal glass-shaped casing (62) may for example be made of at least one continuous layer covering the internal surface (611) of said external glass-shaped casing (61), that is, the surface facing said internal magnet (5).

Said continuous covering layer is preferably deposited by chemical and/or electrochemical processes.

As shown in FIG. 2, said rear body (1) comprises at least one temperature sensor (7), in turn comprising a miniature thermocouple (71) interposed between said external glass-shaped casing (61) and said internal glass-shaped casing (62) and installed within the range of the magnetic field, that is, preferably between said external magnet (3) and said internal magnet (5).

Said thermocouple (71) is connected to at least one cable (72) inserted through a duct (73) obtained in said rear body (1).

Alternatively, said thermocouple (71) may be embedded in the thickness of one or both of said internal glass-shaped casing (62) and external glass-shaped casing (61), preferably installed in the magnetic field, that is, between said external magnet (3) and said internal magnet (5).

Therefore, with reference to the preceding description and the attached drawings, the following claims are made.

The invention claimed is:

1. A device for transmitting power using rotating magnetic fields comprising:
    a drive shaft;
    an external magnet fitted on said drive shaft;
    a pump shaft;
    an internal magnet fitted on said pump shaft and configured to be entrained by said external magnet; and
    a rear tight chamber or rear containment body for said pump shaft and said internal magnet,
    wherein said containment body comprises a cup-shaped casing positioned between said internal magnet and said external magnet,
    wherein said rear tight chamber or rear containment body consists of a first tight cup-shaped casing forming an external cup-shaped casing made of a non-metallic composite material and having a structural function, and a second cup-shaped casing forming an internal cup-shaped metal casing made and housed in said external cup-shaped casing, said second cup-shaped casing being configured to come directly into contact with a pumped fluid, and
    further comprising a temperature sensor or probe that includes a miniaturized thermocouple disposed between said first and said second cup-shaped casing.

2. The device according to claim 1, wherein said miniaturized thermocouple is connected to a cable inserted through a duct obtained in said rear tight chamber or rear containment body.

3. The device according to claim 1, further comprising one or more additional sensors or probes configured to monitor operative conditions of the device and positioned between said external cup-shaped casing and said internal cup-shaped casing.

4. The device according to claim 1, wherein said non-metallic composite material is a thermoplastic, thermoset, or ceramic material.

5. The device according to claim 1, wherein said internal cup-shaped casing consists of at least one continuous layer covering an inner surface of said external cup-shaped casing, said at least one continuous layer having been deposited with a chemical or electrochemical process.

6. The device according to claim 1, wherein the device is configured as a magnetic pump, said pump shaft being connected to one or more impellers.

\* \* \* \* \*